United States Patent
Malcangio et al.

(10) Patent No.: US 11,182,746 B2
(45) Date of Patent: Nov. 23, 2021

(54) SYSTEMS AND METHODS FOR INTEGRATING THIRD-PARTY SERVICES WITH A CLIENT INSTANCE

(71) Applicant: ServiceNow, Inc., Santa Clara, CA (US)

(72) Inventors: Michael Dominic Malcangio, San Diego, CA (US); Krishna Chaitanya Thota, Santa Clara, CA (US); Michael David Thompson, Waukesha, WI (US); Grant Lawrence Hulbert, San Marcos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 512 days.

(21) Appl. No.: 16/133,345

(22) Filed: Sep. 17, 2018

(65) Prior Publication Data

US 2020/0090135 A1    Mar. 19, 2020

(51) Int. Cl.
*G06Q 10/06* (2012.01)
*G06Q 10/10* (2012.01)
*G06Q 30/02* (2012.01)
*H04L 29/08* (2006.01)

(52) U.S. Cl.
CPC ........... *G06Q 10/103* (2013.01); *H04L 67/20* (2013.01); *G06Q 10/1097* (2013.01)

(58) Field of Classification Search
CPC .. G06Q 10/103; G06Q 10/1097; H04L 67/20; H04L 63/102; H04L 63/123; H04L 67/02; H04W 12/10; H04W 12/084
USPC .......................................... 705/301, 1.1–912
See application file for complete search history.

(56) References Cited

U.S. PATENT DOCUMENTS

| | | | |
|---|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

OTHER PUBLICATIONS

OneM2M Technical Specification, Aug. 1, 2014 (Year: 2014).*
https://docs.microsoft.com/en-us/outlook/actionable-messages/actionable-messages-via-email downloaded Jul. 3, 2018, 6 pages.

*Primary Examiner* — Jonathan P Ouellette
(74) *Attorney, Agent, or Firm* — Fletcher Yoder PC

(57) ABSTRACT

The present approach relates to integrating a third-party interface with a client instance hosted by one or more data centers, wherein the client instance is accessible by one or more remote client networks. In accordance with the present approach, a request to incorporate a third-party communication interface with the client instance is determined by the client instance. Then, an authorization to incorporate the communication interface with the client instance interface is verified based at least in part on a comparison between an account authorized to access the third-party communication interface and an account authorized to access with the client instance. In response to the verification, a service request interface from the client instance is integrated with the third-party communication interface. Then, a service request is generated via the client instance based on one or more content from the third-party communication interface and one or more data from the client instance.

16 Claims, 15 Drawing Sheets

(56) References Cited

U.S. PATENT DOCUMENTS

| | | | |
|---|---|---|---|
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,014,756 B1 * | 9/2011 | Henderson | G06Q 20/322 455/411 |
| 8,015,164 B2 | 11/2011 | Peuter | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,288,671 B2 * | 3/2016 | Coghlan | H04W 12/069 |
| 9,317,327 B2 | 4/2016 | Apte | |
| 9,363,252 B2 | 6/2016 | Mueller | |
| 9,461,996 B2 * | 10/2016 | Hayton | G06F 21/31 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,097,513 B2 * | 10/2018 | Barakat | H04L 63/101 |
| 10,846,108 B1 * | 11/2020 | Chung | G06F 8/61 |
| 2004/0249944 A1 * | 12/2004 | Hosking | G06F 9/54 709/225 |
| 2013/0191289 A1 * | 7/2013 | Cronic | G06Q 20/4014 705/67 |
| 2014/0244429 A1 * | 8/2014 | Clayton | G06Q 30/0631 705/26.7 |
| 2014/0244447 A1 * | 8/2014 | Kim | G06Q 30/0643 705/27.2 |
| 2015/0180948 A1 * | 6/2015 | Shao | H04L 67/20 709/203 |
| 2015/0289123 A1 * | 10/2015 | Shatzkamer | G06Q 10/06 455/406 |
| 2020/0028755 A1 * | 1/2020 | Zolotow | H04L 41/5032 |

* cited by examiner

SYSTEMS AND METHODS FOR INTEGRATING THIRD-PARTY SERVICES WITH A CLIENT INSTANCE

BACKGROUND

The present disclosure relates generally to integrating a third-party interface and a client interface for generating a service request.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In such a cloud-based context, a user may rely on multiple software resources to perform various enterprise operations; however, certain software resources (e.g., third-party applications) may be unable to communicate with the network supported by the cloud computing services. Additionally, information in the third-party applications may be relevant for enterprise operations such as in the generation of incident reports or managing tasks (e.g., in a Visual Task Board (VTB). However, certain security authentication protocols may prevent the third-party applications from communicating with the network and, thus, extracting the information from the third-party applications may be a tedious endeavor.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates generally to systems and methods for integrating a third-party interface, such as a third-party communications interface, related to a third-party application with a client instance. The systems and methods disclosed herein determine a request to incorporate the third-party communication interface with the client instance. In certain embodiments, the request may be a user selecting a plug-in on the third-party communication interface. In other embodiments, the request may be generated based on trigger data in the third-party communication interface, such as keywords or numbers. The computer may then verify an authorization to incorporate the third-party interface with the client instance interface based at least in part on a comparison between a first account authorized to access the third-party interface and a second account authorized to access with the client instance. Then, the computer service may integrate a service request interface from the client instance with the third-party interface in response to the verification. Once the client instance and the third-party interface are integrated, certain operations in the client instance may be executed (e.g., by a user) directly from the third-party interface. Further, the computer system may generate a service request via the service request interface based at least in part on first content data entered using the third-party interface and second content data accessed from the client instance. In some embodiments, the service request may be generated based on an association between the first content data and the second content data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is a screenshot of an embodiment of the third-party interface with the service request interface, in accordance with aspects of the present disclosure;

FIG. 13 is a screenshot of another embodiment of the third-party web service having a survey, in accordance with the present disclosure;

FIG. 15 is a screenshot of survey results provided to a client instance, in accordance with the present disclosure.

DETAILED DESCRIPTION

Figure 1:
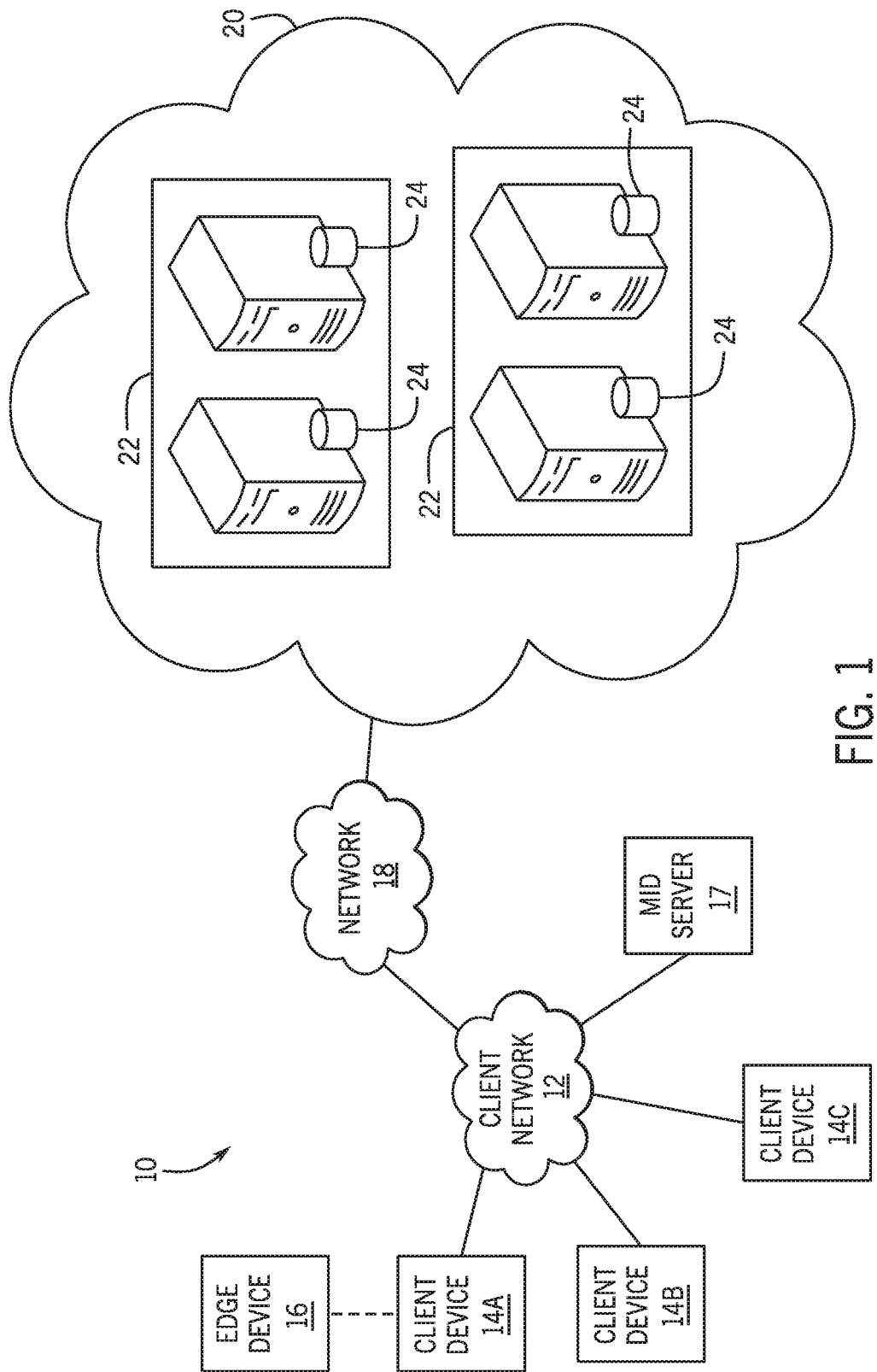
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, a "third-party" is an entity separate and distinct from the provider of a given cloud based system or platform and from the customers or clients who use the cloud based system or platform.

As discussed herein, an enterprise may use a cloud-based developmental platform that supports multiple applications or software packages to allow users to perform enterprise operations or tasks. Supported software may communicate with a client instance made available on the cloud based platform and, thus, readily receive and transmit data using such a platform. Certain enterprise operations may be performed on applications that are not directly supported by the platform. For example, users of the cloud based platform may use a third-party application, such as an email, webservice, or calendar service, to schedule events. The third-party applications may present certain data to the users via a third-party interface associated with the application or, generally, contain certain data relevant to the client instance implemented on the cloud based platform for certain enterprise operations (e.g., generating incidents, visual task boards). As the third-party applications cannot communicate with the client instance, it may be a tedious task to extract the relevant data. It is presently recognized that is advantageous to develop methods that enable integration of third-party applications with the client instance accessed by such users. Such advantages may generally include the transfer of data from the third-party software to improve the efficiency of operations within an enterprise.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
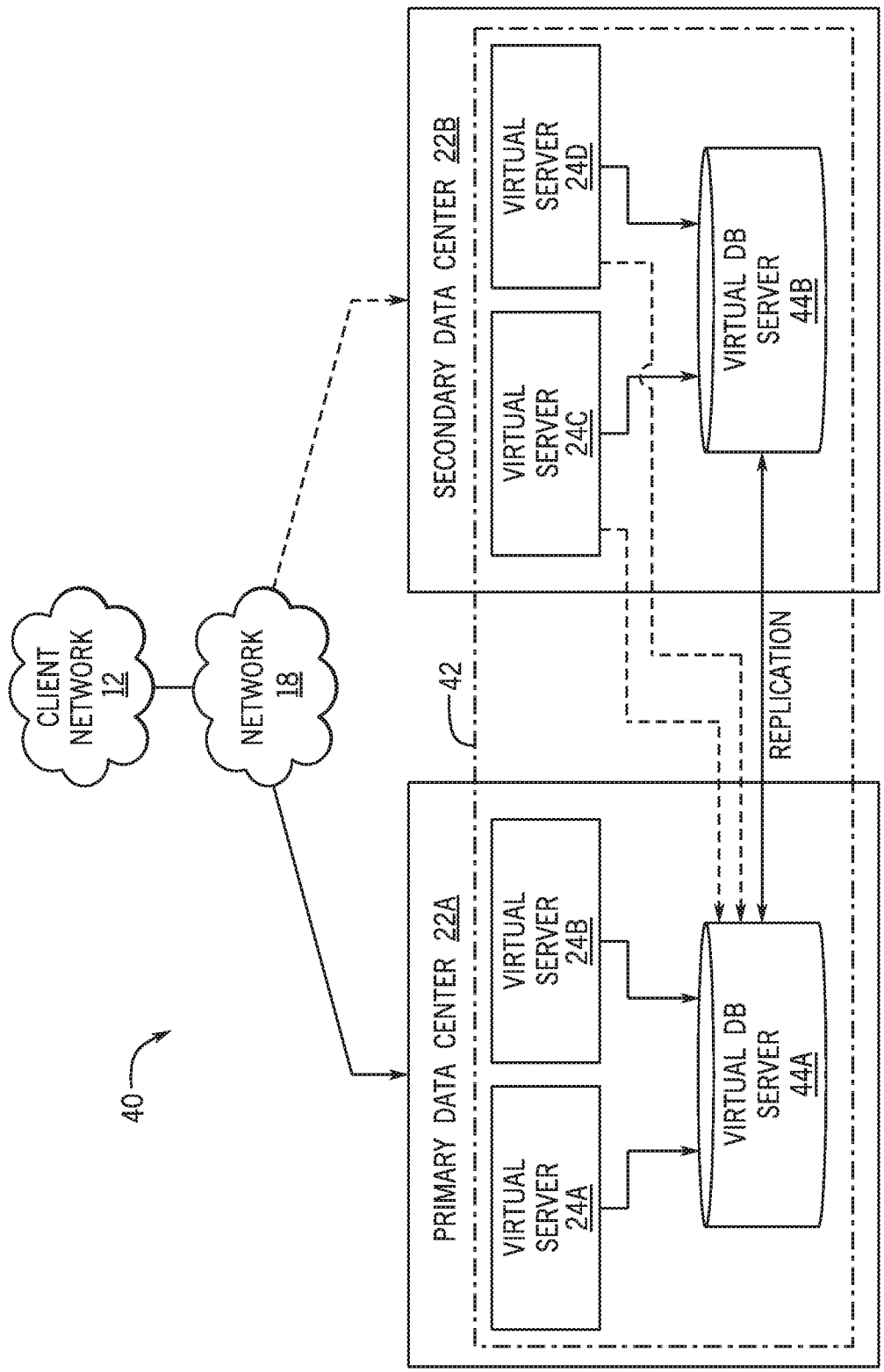
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
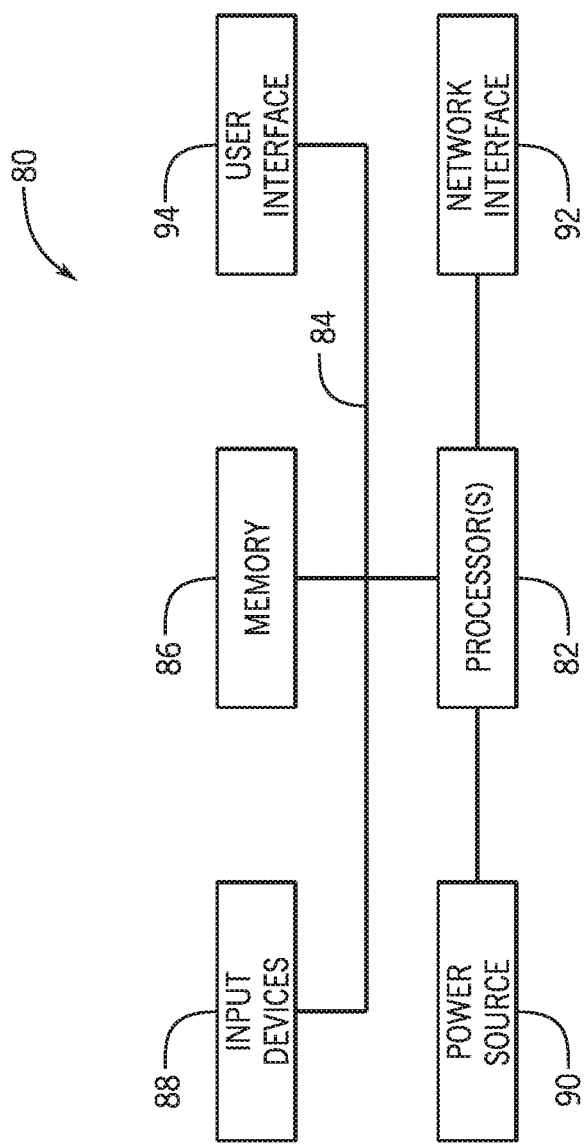
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
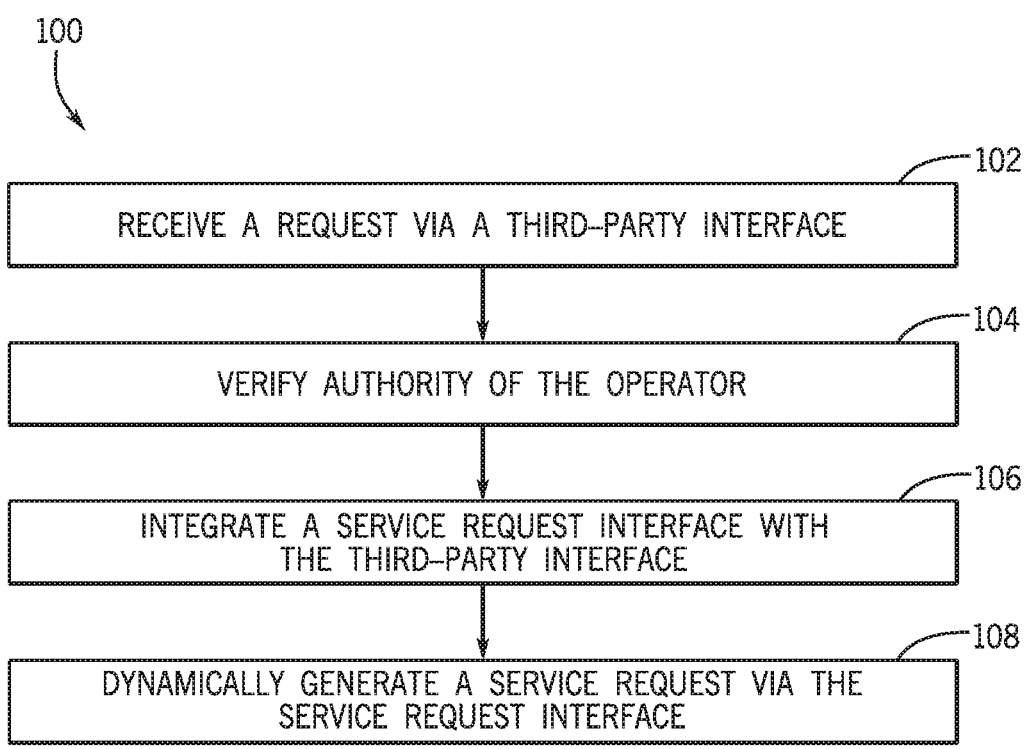
FIG. 4 is a flow diagram for generating a service request based on first content data from a third-party interface and second content data from a client instance, in accordance with aspects of the present disclosure.

With the preceding in mind, FIG. 4 is a flow diagram 100 for generating a service request based on content (e.g., content data) from a third-party application interface, in accordance with aspects of the present disclosure. The steps illustrated in the flow diagram 100 may be performed on a client devices 14 operated by a client (e.g., on a client instance) on the network 12 or on other suitable devices present on the cloud computing system 10 and operated by users of the client network 12. Furthermore, the steps illustrated in the flow diagram 100 are meant to facilitate discussion and are not intended to limit the scope of this disclosure, since additional steps may be performed, certain steps may be omitted, and the illustrated steps may be performed in any order.

The flow diagram 100 may include determining (process block 102) a request to incorporate a third-party interface with the client instance. As discussed herein, the third-party interface may display information relevant to certain enterprise operations such as virtual dates, service requests, activities, etc. Incorporating the third-party interface with the client instance may facilitate the transfer of the relevant information to the client instance. The request may be generated in response to a user (e.g., employee, service agent, administer) that interacted with an interface of a third-party application (e.g., a third-party interface such as a third-party communication interface (e.g., an email or calendar interface)). In a service context, the request may be automatically initiated based on one or more trigger data or phrases that are indicative of an incident or a new task. In some embodiments, the request may submitted by an operator via interaction such as clicking an interactive element (e.g., a button on the interface, selectable on the third-party communication interface such as a button or plug-in. For example, the third-party communication interface may include one or more plug-ins After receiving (process block 102) the request via the third-party interface, the computing system may verify (process block 104) an authorization to integrate or link the communication interface (e.g., third-party communication interface). The authorization may be based on a comparison between an account associated with the third-party application and an account associated with the client interface. For example, a user of the computing system 10 may have a first account associated with the third-party application and a second account associated with the client instance. In some embodiments, the client instance may identify the account (e.g., associated with the client instance) making the request and, further, whether or not the account making the request has sufficient permissions for integrating the third-party interface with the client instance. In some embodiments, verification may include a token validation scheme.

After verifying (process block 104) an authorization, the cloud computing system 10 may integrate (process block 106) aspects of an instance-based service request interface or form with the third-party interface. For example, the third-party interface may be configured to display the service request interface within the third-party interface. Additionally, the service request interface may be configured to receive data (e.g., auto-populate fields) from the third-party interface.

After integrating or otherwise linking all or part of the service request interface associated with the client instance with the third-party interface, the computing system 10 may dynamically generate (process block 108) a service request via the service request interface. For example, based on the integration between the third-party interface and the service request interface, the service request interface may extract certain data from the third-party interface for use by the service request interface implemented as part of a client instance.

Figure 5:
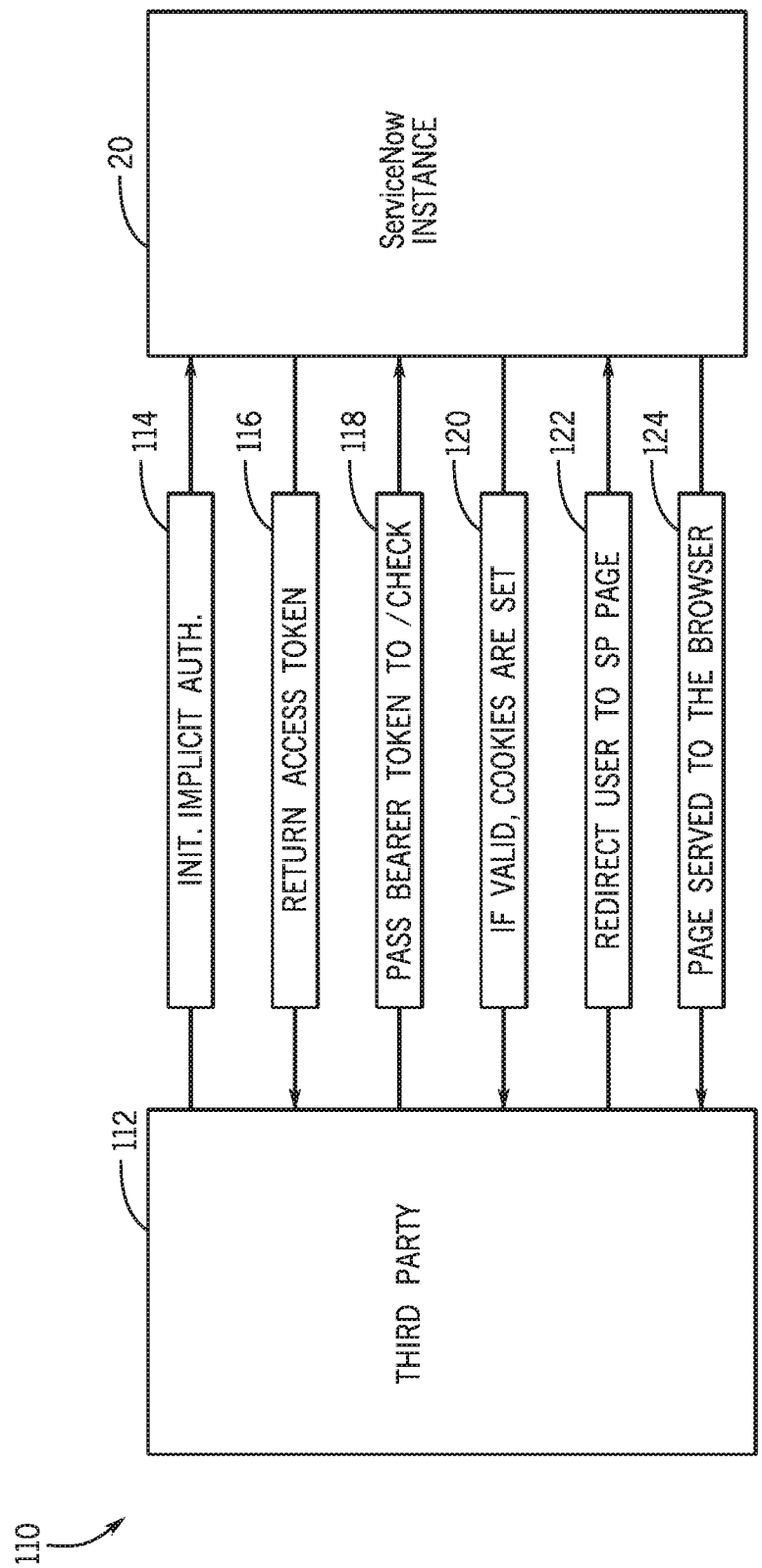
FIG. 5 is a swim diagram for verifying an authority of an operator, in accordance with aspects of the present disclosure.

With the foregoing in mind, FIG. 5 is a swim diagram 110 for verifying (process block 104) the authority of the operator of a client device 14 executing a third party application having information or data that may be useful if provided to an application running on the client instance. It should be appreciated that the block diagram 110 is meant to be an illustrative and non-limiting example of one approach to verifying the authorization.

As discussed herein, the client instance 20 may determine a request has been made by a third-party application 112. For example, the client instance may receive (process block 114) a request for a token from a third-party application 112. By way of example, the request may be an open authentication code request (e.g., 'init implicit OAuth'). The request may either be granted automatically based on the source of the request or manually by an administrator and/or an authenticated user. In response to determining that the request has been made, the client instance 20 may return (process block 116) or transmit an access token to the third-party application 112. In some embodiments, the access token may enable the client instance 20 to communicate with an application programming interface (API) associated with the third-party application 112. Then, the client instance 20 may receive (process block 118) a token (e.g., 'pass bearer token') from the third-party application. In some embodiments, the client instance 20 may determine whether the token is still valid, as the token may be valid for only a limited duration. If the token is valid, the client instance 20 sets (process block 120) cookies, which may facilitate integration between the third-party application 112 and the client instance. That is, the client instance 20 may redirect (process block 122) the third-party application 112 to an instance-based application having a service request interface. In response, the client instance 20 serves (process block 124) the service request interface to the third-party application.

Figure 6:
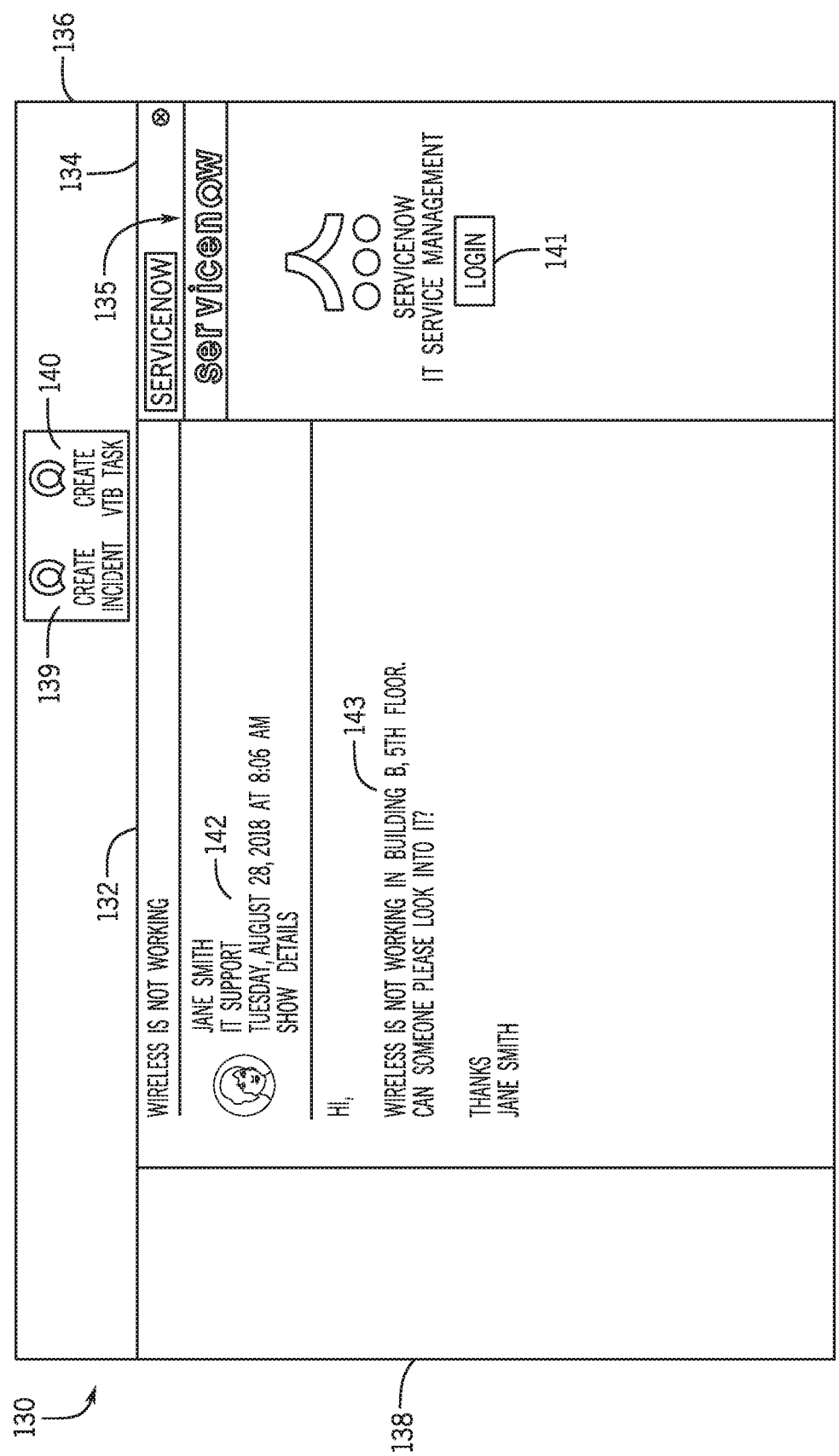
FIG. 6 is a screenshot of an embodiment of a third-party interface with a verification interface, in accordance with aspects of the present disclosure.

To further help illustrate the steps in the flow diagrams 100 and 110 of FIGS. 4 and 5, FIG. 6 is a screenshot of an embodiment of a third-party interface 130 incorporating aspects or features of a client interface 134, in accordance with aspects of the present disclosure. In some embodiments, the third-party interface 130 may be the screen that is displayed when the third-party application such as email service, calendar service, and/or web portal service is being run. For example, the third-party interface 130 may be displayed on a screen of a client device 14 operated by a user. The client interface 134 may be all or part of a service request that is displayed when the user interacts directly with a service request application on the client instance 20. As discussed herein, upon integration of the client interface 134 with the third-party interface 130, the client interface 134 may communicate (e.g., transmit and receive data) with the third-party interface 130. More specifically, the client instance 20 may communicate with the third-party application 112, and data may be be displayed on the client interface 134 that is indicative of communication between the client instance 20 and the third-party application 112.

The third-party interface 130 in FIG. 6 includes a body 132, a first tab 136, and a second tab 138. The communication window 132 generally displays data via an email, calendar, or other suitable third-party applications. The first tab 136 and second tab 138 may include one or more selectable items that a user, operator, and/or administrator may select (e.g., via clicking) to execute a request. As illustrated, the first tab 136 includes a first selectable item 139 and a second selectable item 140. It should be appreciated that while only two selectable items are shown, one or more than two selectable items may be present. As illustrated the first selectable item 139 is an incident report button, and the second selectable item 140 is a Visual Task Board (VTB) request.

The client interface 134 in FIG. 6 shows a verification screen 135. The verification interface 135 may include one or multiple fields for a user to fill out, such as an identity or name field and a password field associated with the client instance 20. When the user fills out the fields, the user may attempt verification of the user via a verification selection 141 (e.g., 'login'). The authorization of the requestor may then be verified via the flow diagram 110 discussed in FIG. 5.

Figure 7:
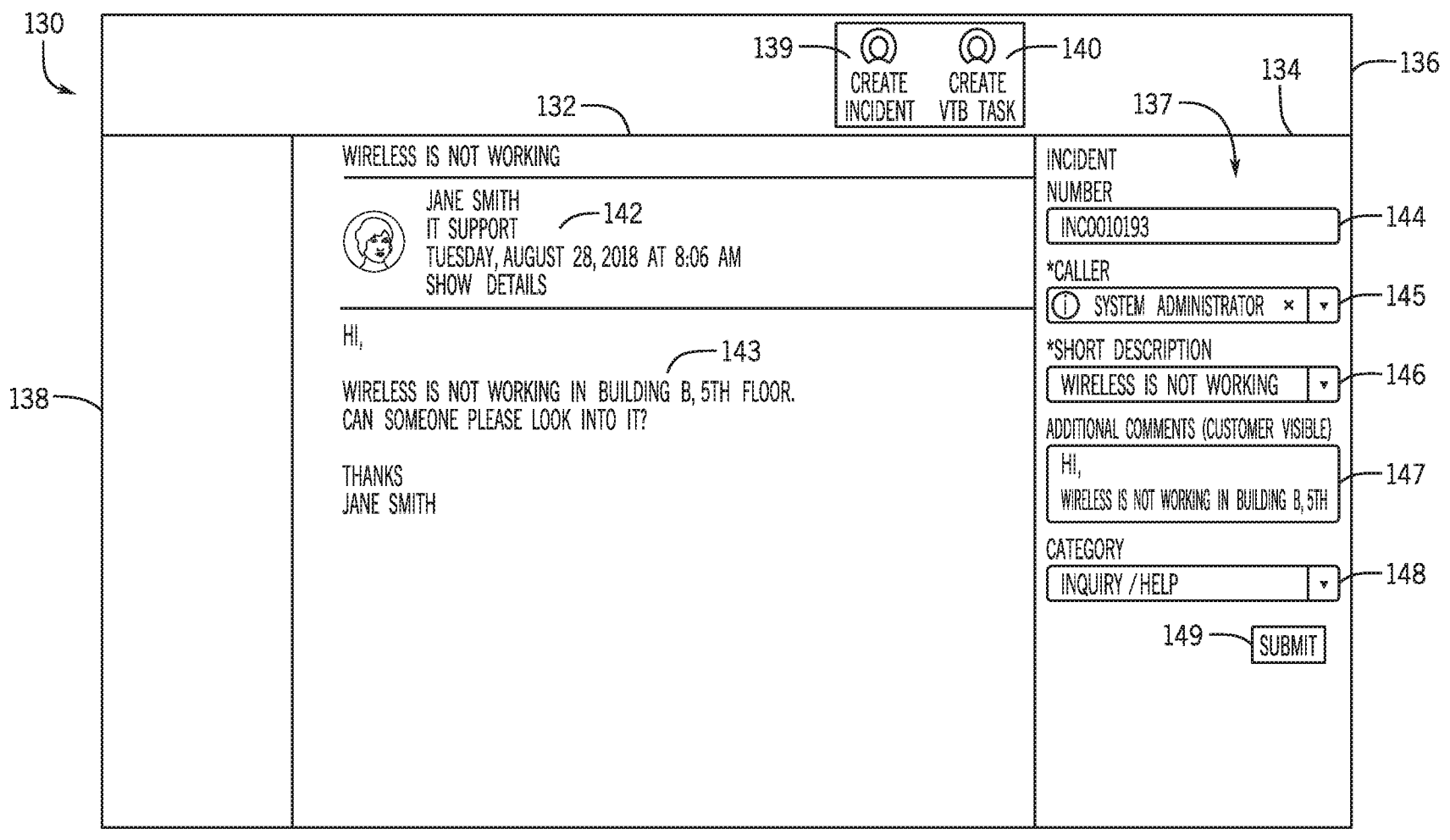

FIG. 7 is a screenshot of an embodiment of the third-party interface 130 with the integrated client interface or service request interface 134, in accordance with aspects of the present disclosure. As shown, the service request interface 134 is displaying a service request form 137 in communication with the client instance in response to verification of the authority of the operator.

The service request form 137 includes one or more fields such as an incident number 144, a caller 145, a short description 146, additional comments 147, and a category 148 that may be filled out or automatically populated based on interaction between the client instance 20 and an API associated with the third-party interface. In some embodiments, the queries may be populated based on data extracted from the body 132 in the third-party interface. For example, the interface may use an API to retrieve data (e.g., a message) from the communication window 132 and populate an associated fields 144-148 of the service request form 137. As illustrated, a portion of the body 143 of the communication window 132 is used to populate the additional comments field 147, and data from the heading 142 is used to populate the short description fields 146. In general, the one or more fields 144-148 may be automatically populated based on an association between content data related to the service request form 137 and the content data related to the components of the communication window 132 (e.g., the body, the heading, email addresses). In some embodiments, the display shown on the third-party interface may be based on identity of a user (e.g., determined based on a comparison of data stored in the database) that accesses the verification selection 141. For example, an IT service agent or administrator accessing the verification selection 141 may be directed to an interface where the IT service agent, or the like, can determine what is displayed on the service request form 137.

Figure 8:
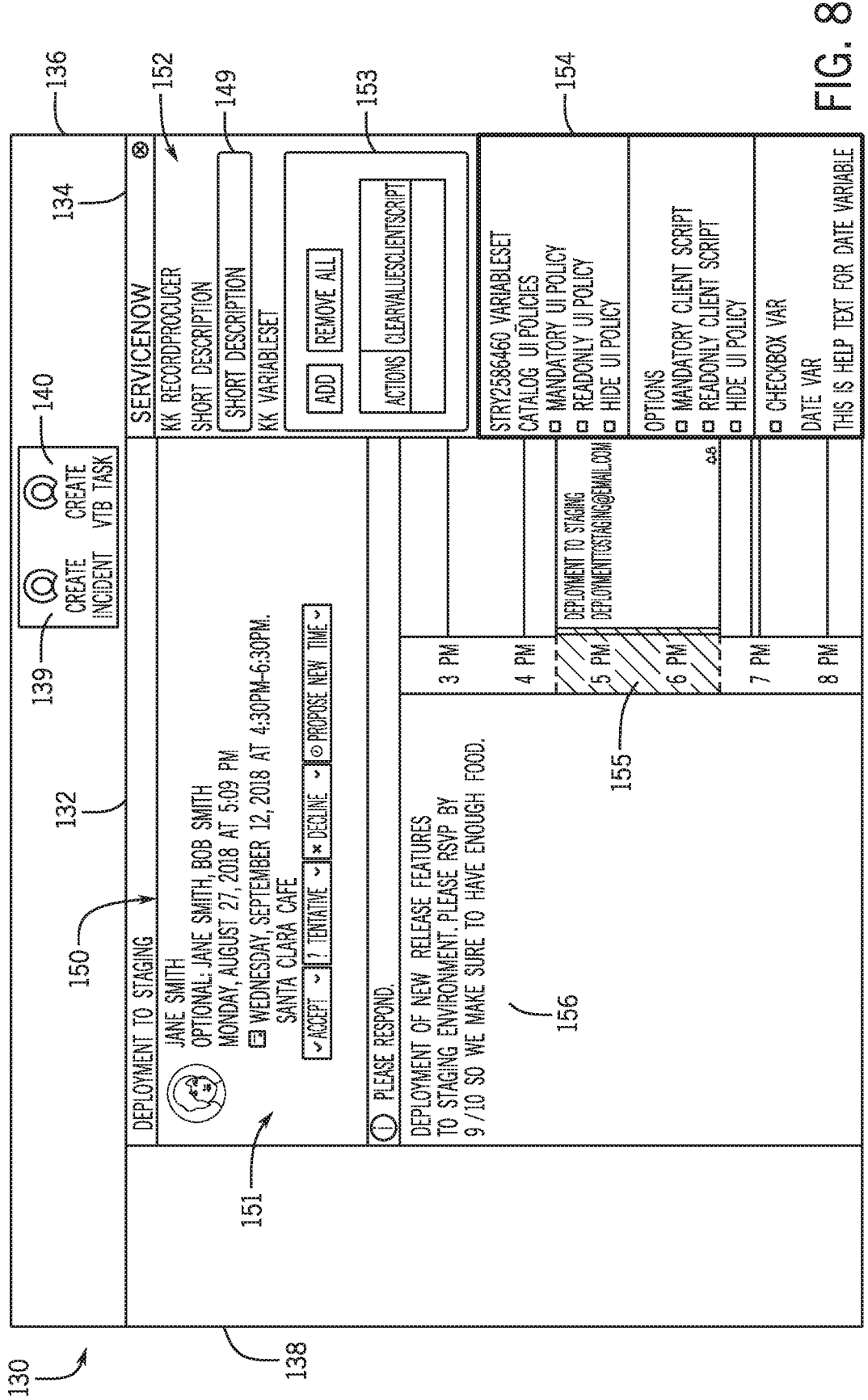
FIG. 8 is a screenshot of an embodiment of the service request interface with dynamically generated content from the third-party interface, in accordance with aspects of the present disclosure.

FIG. 8 is a screenshot of an embodiment of the service request interface 134 with dynamically generated content from the third-party interface 130, in accordance with aspects of the present disclosure. The communication window 132 displays a calendar invite window 151 that includes a heading 150, a body 156, and a calendar 155. As illustrated, the service request interface 134 displays a VTB task form 152 that includes multiple queries such as a short description 149, and dynamically generated fields for user input such as the fields 153 and 154 that a user may interact with to modify the service request interface. The VTB task form 152 may be generated in response to a user selecting the 'create VTB task' interactive element 140. For example, the VTB task form 152 may extract the date shown in the calendar 155 via API from the third-party interface 130 (e.g., retrieved by the client instance 20).

The discussion above relates to generating a service request based on an integration between an instance-based support interface (supported by a cloud based platform) and a third-party interface. As discussed herein, the third-party interface may be a third-party communications interface such as an email or calendar. The integration between the third-party interface and the instance-based support interface may be initiated based on a request from a client device 20. After the request is generated, the authorization may be verified. Verification may include one or more steps of communication between the third-party device and the client device. For example, the steps may include an open authentication protocol which results in the generation of a token. Upon validation of the token by the client instance, the client instance may provide a cookie that facilitates the integration between the client instance the third-party interface.

Another aspect of the present disclosure is directed towards providing actionable content to an employee through a third-party communications service. Employees within an enterprise may use a third-party communications service to conduct certain enterprise operations, such as those related to human resources, IT service management, IT operations management, and customer service management. Certain techniques for communicating data to users within an enterprise may include providing html links, which lead to surveys or various inquiries related to enterprise operations. In some embodiments, the actionable content may be generated using existing libraries within the third-party instance. That is, the client instance may utilize the libraries of the third-party interface to generate actionable content that can be integrated within the third-party interface.

Figure 9:
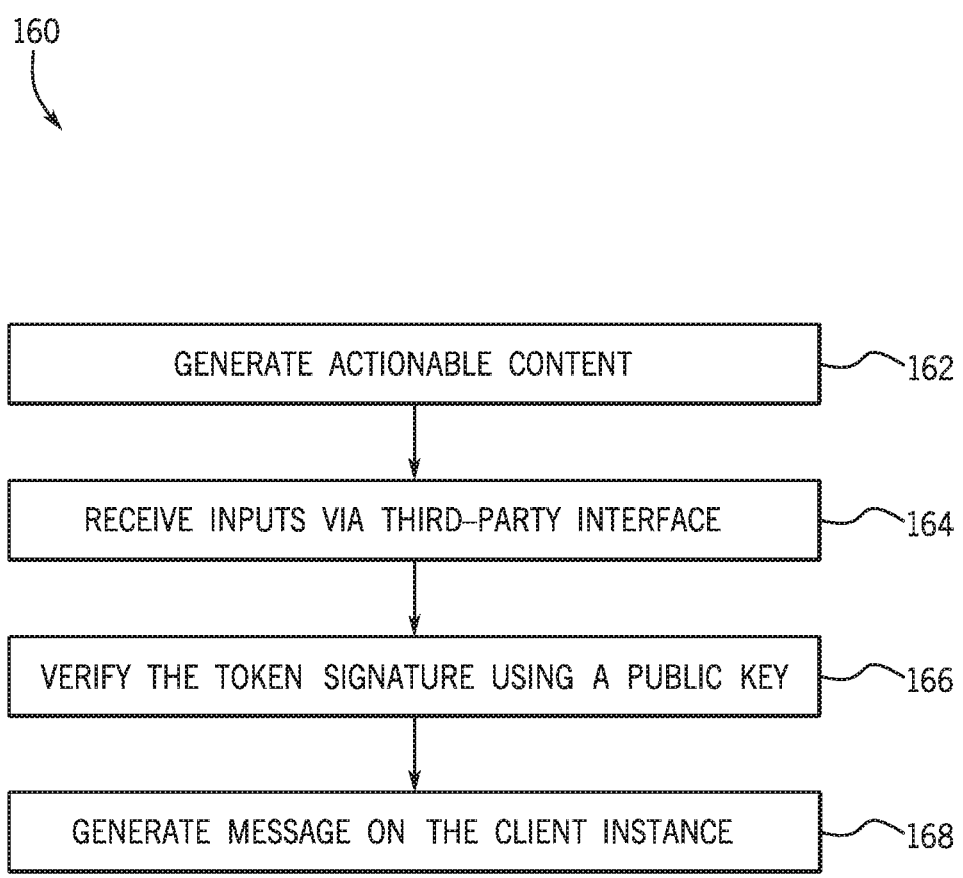
FIG. 9 is a block diagram for generating a message on a client instance based on actionable content, in accordance with the present disclosure.

FIG. 9 is a flow diagram 160 for generating a message on a client instance based on actionable content, in accordance with the present disclosure. The steps illustrated in the flow diagram 160 may be performed by a client devices 14 operated by a client (e.g., on a client instance) on the network 12 or by other suitable devices on the cloud computing system 10. Furthermore, the steps illustrated in the flow diagram 160 are meant to facilitate discussion and are not intended to limit the scope of this disclosure, since additional steps may be performed, certain steps may be omitted, and the illustrated steps may be performed in any order.

The flow diagram 160 may include generating (process block 162) actionable content. For example, the actionable content, as used herein, may be understood to be a selectable or interactive feature with which a user may interact to generate a response in lieu of accessing a web link and being redirected to an external location or another location within a client instance to provide a response. The actionable content may intrinsically communicate and act over the web link so as to provide this functionality without the user having to leave or navigate from document having the actionable content. Thus the actionable link allows a user to perform an action associated with a separate web link location (such as elsewhere in a client instance) without leaving the document the user is in. Examples of functions for which use of actionable content may be useful include, but are not limited to a survey including one or more selectable features, one or more fillable fields for specifying corresponding prompts, and so forth. Additionally, the actionable content may be suitable for approving and rejecting orders within an enterprise or other approval/disapproval type functionality. After generating (process block 162) the actionable content, the cloud computing system 10 may receive (process block 164) inputs via a third-party application.

After receiving (process block 164) the inputs via the third-party interface, the computing system 10 may verify (process block 166) that a token signature from the third-party application is valid for a known public key of the third-party application. After verifying (process block 166) that the token is valid, the client device 14 may generate (process block 168) a message on the client instance.

Figure 10:
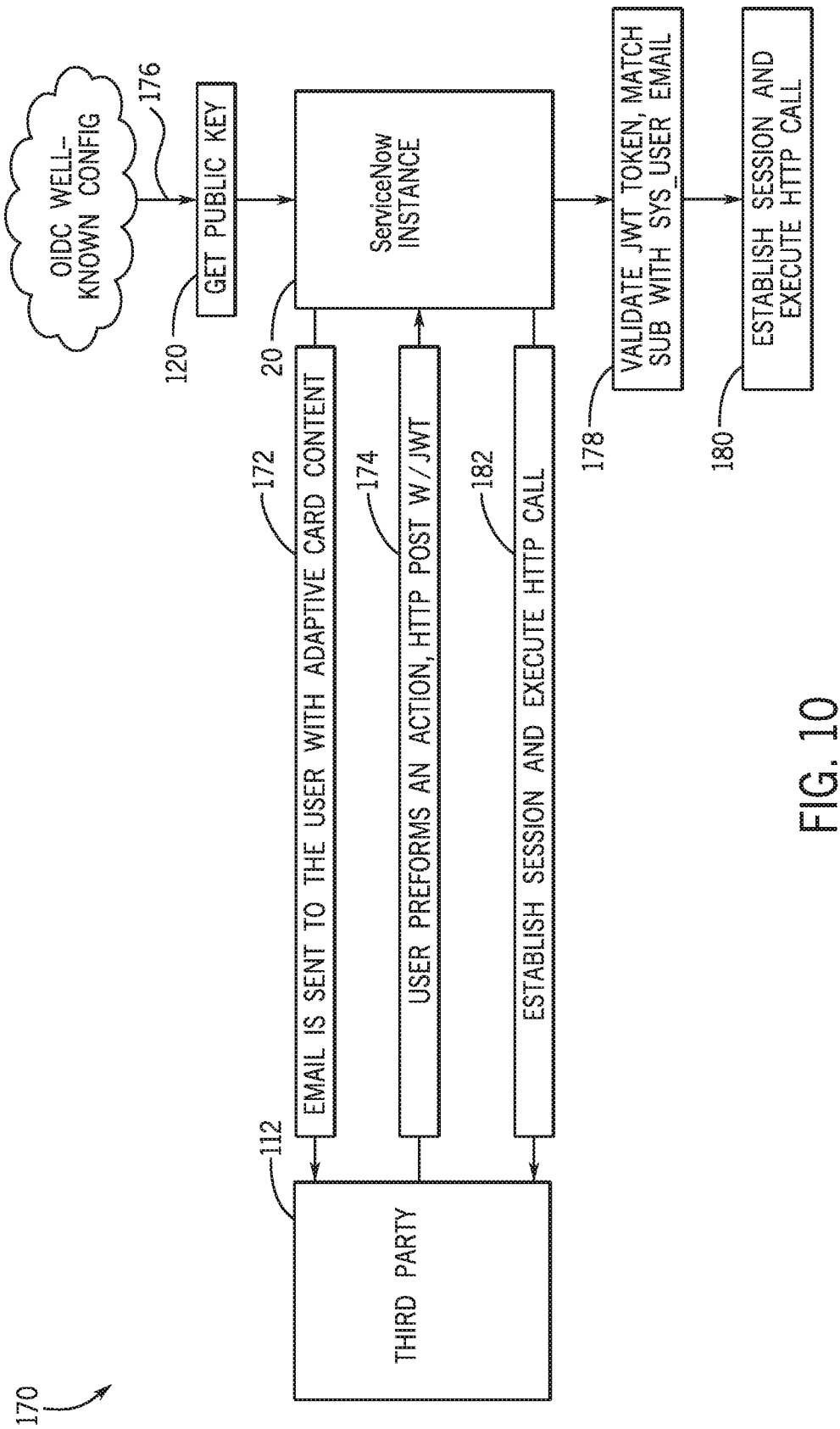
FIG. 10 is a flow diagram for verifying a public key matches a private key, in accordance with the present disclosure.

FIG. 10 is a block diagram 170 for verifying (process block 166) a token signature using a public key, in accordance with the present disclosure. In general, the third-party application 112 communicates data with the client instance 20, such as messages, keys, and tokens. An email may be sent (process block 172) from the client instance to the third-party application 112 (e.g., third-party web service). Further, the email may include adaptive card content. The email may be subsequently displayed on an interface shown on a screen of the client device 14 that a user may interact with. As discussed herein, the interface may include one or more actionable content. In response to the user interacting with actionable content, the client instance 20 may receive one or more inputs related to the user's interaction. In some embodiments, the input may be a hypertext transfer protocol (HTTP) post with a JWT token. The client instance 20 uses the token to retrieve (process block 178) a public key. The client instance 20 may validate the JWT token and match the input from the third-party application 112 with a user's identity stored in a database (e.g., 104) accessible by the client instance 20. In some embodiments, the match may use the user's email. In response to validating the JWT token, the client instance may establish a session and execute a HTTP call. The client instance may respond (process block 182) with a message or refresh the adaptive card content.

Figure 11:
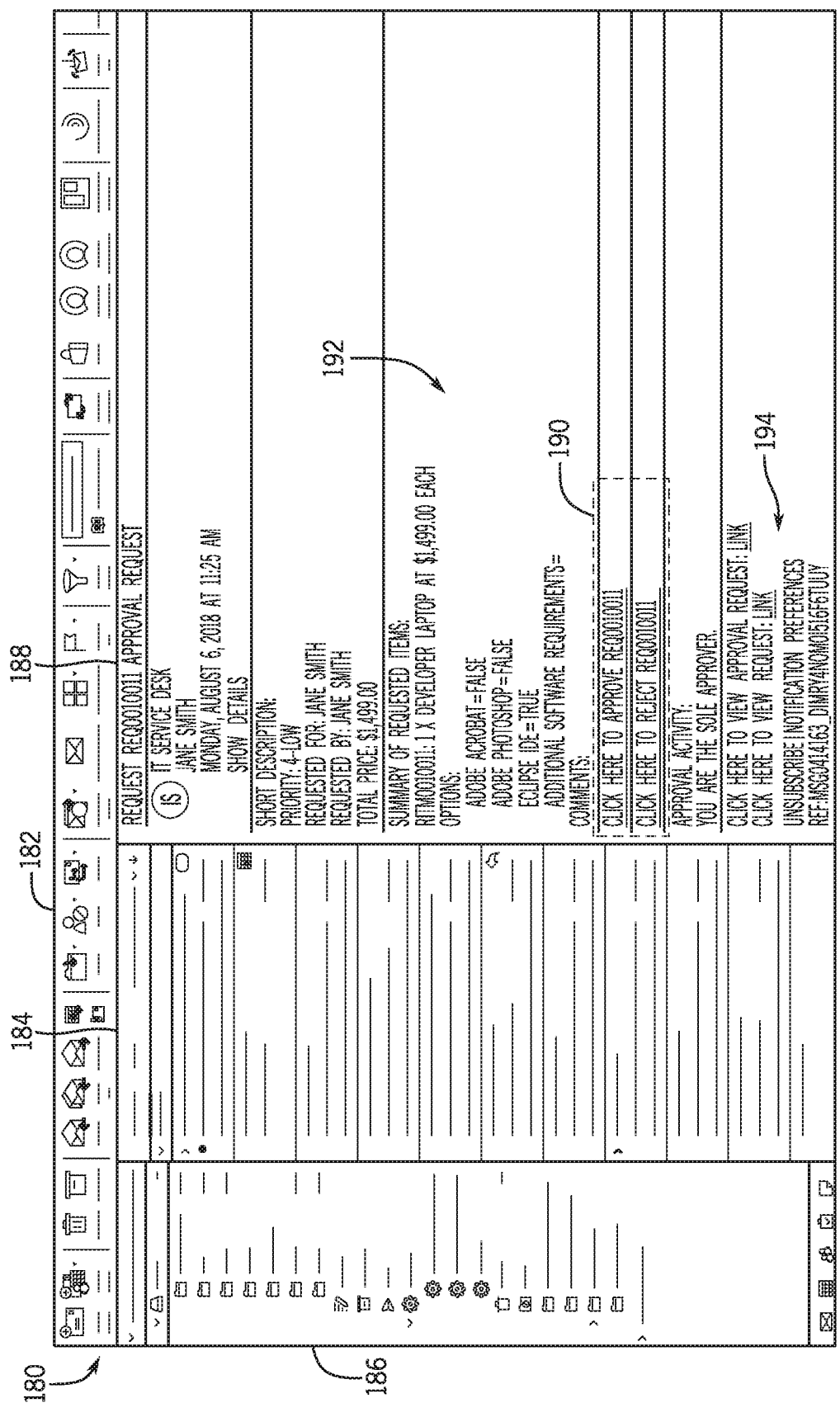
FIG. 11 is a screenshot of an embodiment of a third-party web service having a link, in accordance with the present disclosure.

To further help illustrate the steps in the flow diagram 160 and block diagram 170 of FIGS. 9 and 10, FIG. 11 is a screenshot of an embodiment of a third-party web service having actionable content, in accordance with the present disclosure. In some embodiments, the third-party interface 180 may be the screen that is displayed when the third-party application such as email service is being run. For example, the interface 180 may be displayed on a screen associated with computing system 10 accessible to the operator.

FIG. 10 is a block diagram 170 for verifying (process block 164) a token signature using a public key, in accordance with the present disclosure. In general, the third-party application 112 communications data with the client instance 20, such as messages, keys, and tokens. An email may be sent (process block 172) from the client instance to the third-party application 112 (e.g., third-party web service). Further, the email may include adaptive card content. The email may be subsequently displayed on an interface shown on a screen of the client device 14 that a user may interact with. As discussed herein, the interface may include one or more actionable content. In response to the user interacting with actionable content, the client instance 20 may receive one or more inputs related to the user's interaction. In some embodiments, the input may be a hypertext transfer protocol (HTTP) post with a JWT token. The client instance 20 uses the token to retrieve (process block 178) a public key. The client instance 20 may validate the JWT token and match the input from the third-party application 112 with a user's identity stored in a database (e.g., 104) accessible by the client instance 20. In some embodiments, the match may use the user's email. In response to validating the JWT token, the client instance may establish a session and execute a HTTP call. The client instance may respond (process block 182) with a message or refresh the adaptive card content.

To further help illustrate the steps in the flow diagram 160 and block diagram 170 of FIGS. 8 and 9, FIG. 11 is a screenshot of an embodiment of a third-party web service having actionable content, in accordance with the present disclosure. In some embodiments, the third-party interface 180 may be the screen that is displayed when the third-party application such as email service is being run. For example, the interface 180 may be displayed on a screen associated with computing system 10 accessible to the operator.

The third-party interface 180 in FIG. 11 includes tabs (e.g., navigation panels) 182, 184, and 186, and a communication window 188. The tabs 182, 184, and 186 generally include one or more plugins or collapsible displays for display information to a user. The communication window 188 generally displays actionable content 190 that a user may interact with as discussed herein, a body 192 that displays information relevant to the user, and an interactive portion 194. As illustrated, the actionable content 190 provides two options for the user to select (e.g., approve or reject). The interactive portion 194 may be executed by the user to unsubscribe from the sender of the message or change preferences associated with how the message is presented or how the user is notified.

Figure 12:
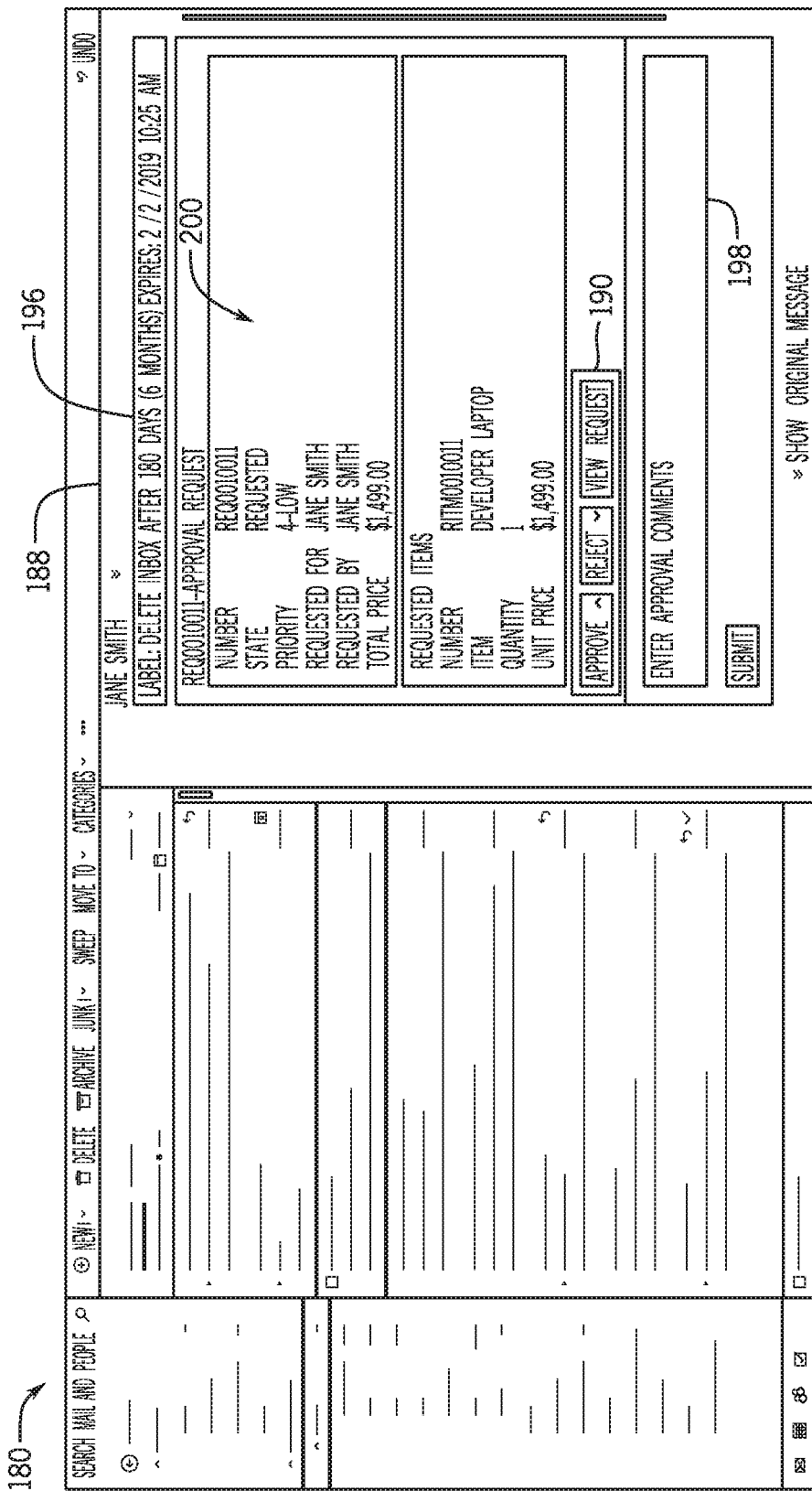
FIG. 12 is a screenshot of another embodiment of the third-party web service having a selectable approve or reject request, in accordance with the present disclosure.

FIG. 12 is a screenshot of another embodiment of the third-party web service having a selectable approve or reject request, in accordance with the present disclosure. As illustrated, the communication window 188 is displaying actionable content 190 that includes an 'approve', 'reject', and a 'view request' selectable option. The communication window 188 also displays a notification 196 that may present a time limit for responding or interacting with the actionable content, and a comment section 198 for a user to provide feedback related to the actionable able content 190. Additionally, the communication window 188 includes an actionable content information section 200 that may display information related to the actionable content (e.g., 'number', 'state', 'priority', 'requested for', 'requested by', and a 'price'.)

Figure 13:
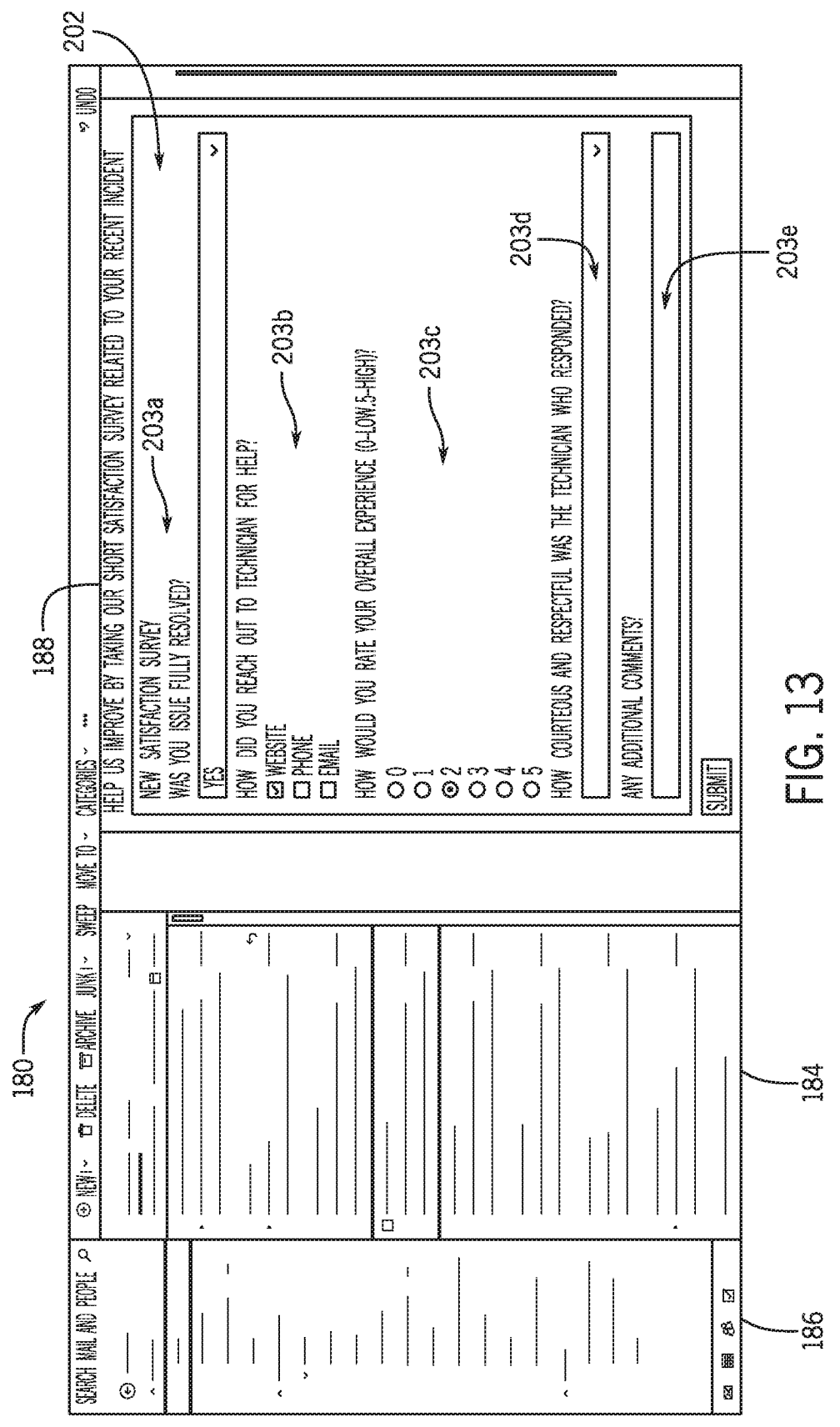
Figure 14:
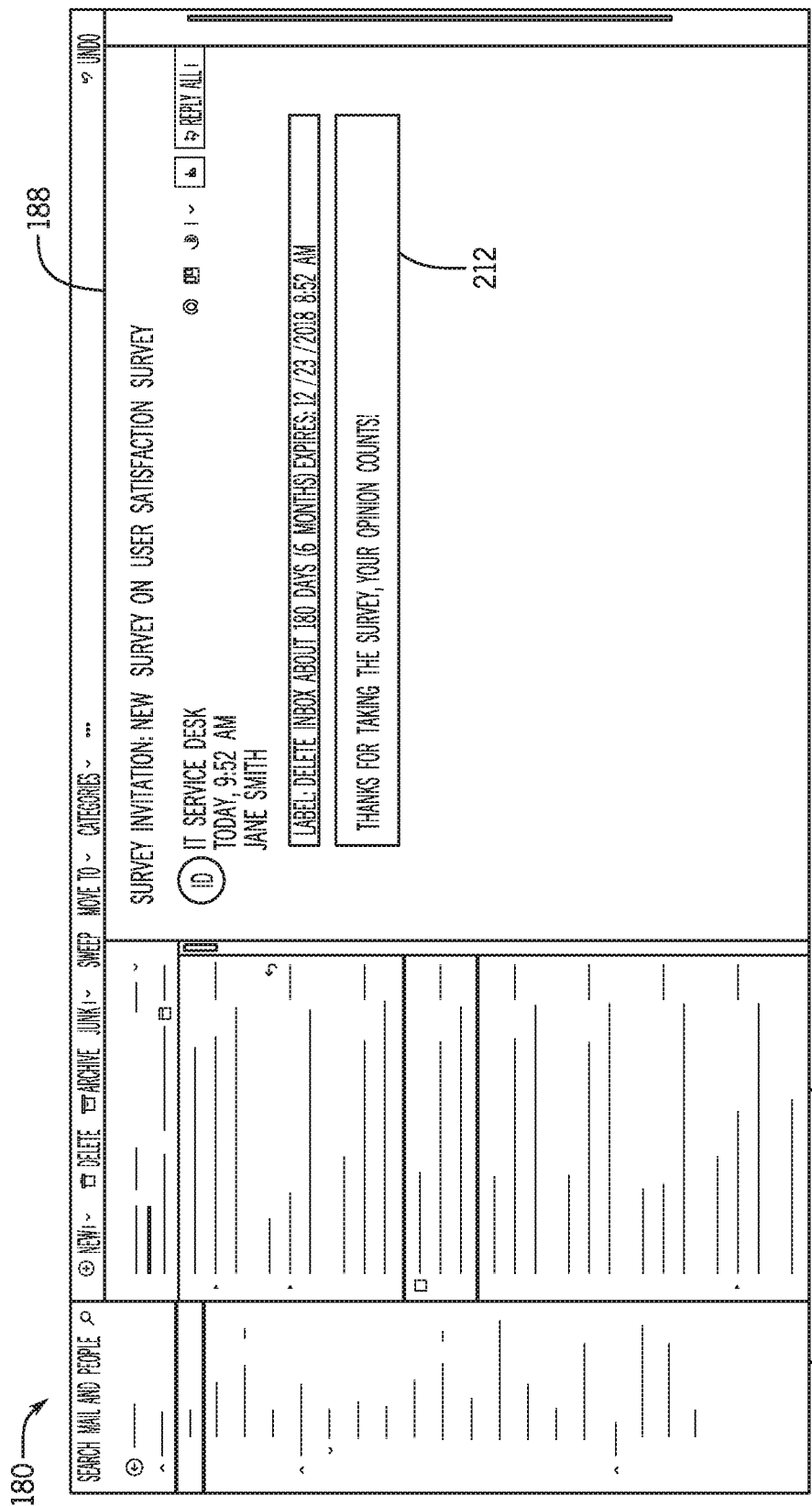
FIG. 14 is a screenshot of another embodiment of the third-party web service having feedback for a user, in accordance with the present disclosure.

FIG. 13 is a screenshot of another embodiment of the third-party web service having a survey 202, in accordance with the present disclosure. As illustrated, the communication window 188 displays multiple selectable features 203a, 203b, 203c, 203d, and 203e related to the survey 202. The selectable features 203 may be collectively referred to as actionable content 190. More specifically, the actionable content 203a is a 'yes/no' inquiry, selectable features 203b is a multiple-box selection inquiry, selectable features 203c is a numerical rating, and selectable features 203d and 203e are comment boxes. As such, the actionable content 190 may be a variety of forms, all or any of which may presented to a user via a third-party web-service. FIG. 14 is a screenshot of another embodiment of the third-party web service having feedback 212 for a user, in accordance with the present disclosure. As illustrated, the communication window 188 is displayed feedback 212 such a text or video, which may be sent in response to the user completing the survey 202.

Figure 15:
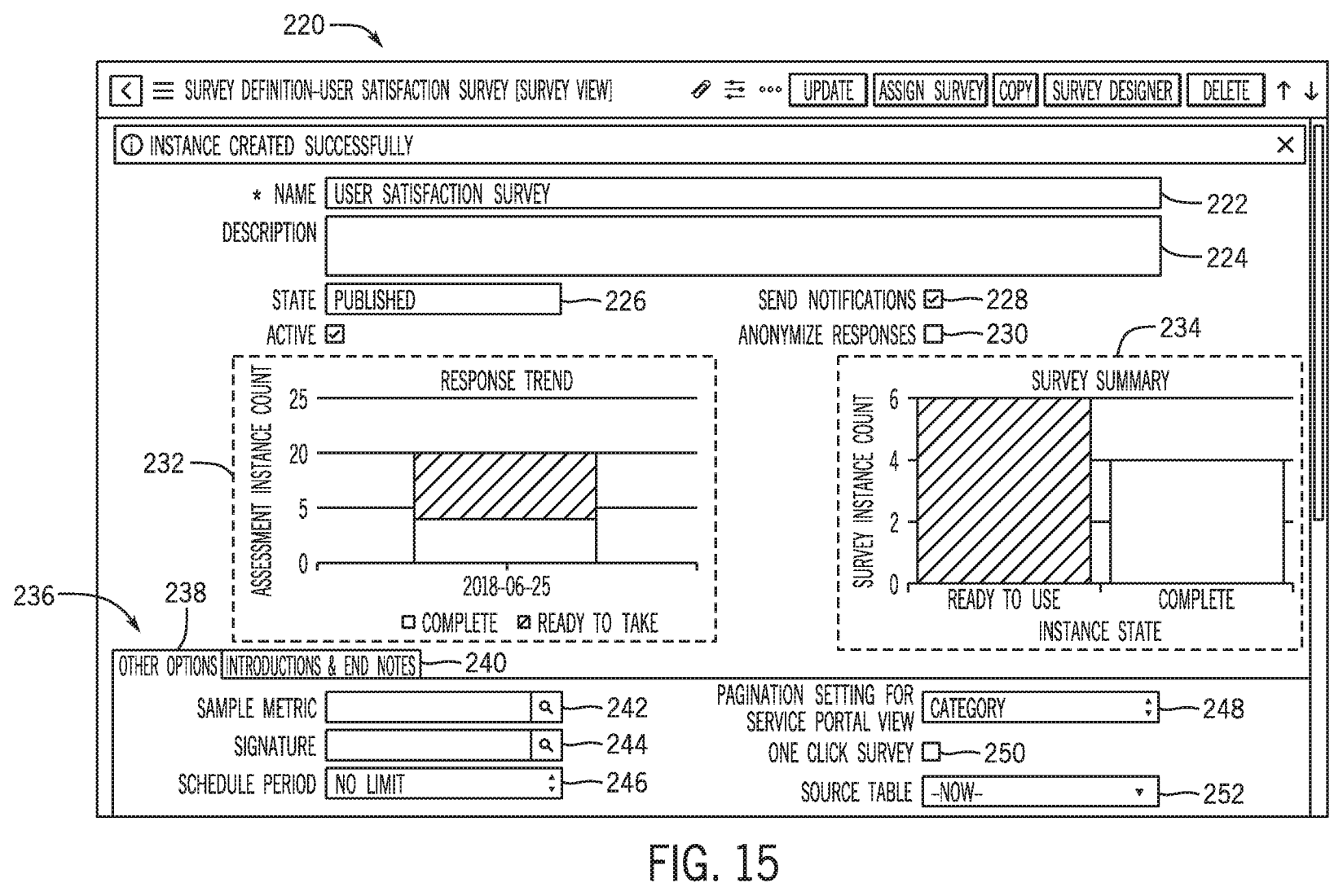

FIG. 15 is a screenshot of survey results 220 provided to a client instance, in accordance with the present disclosure. In addition to presenting actionable content 190 to a user, the present techniques may also generate and display results to an administrator that indicate one or more user's interactions with the actionable content 190. The survey results 220 (or more generally, actionable content 190 results) may include one or more fields that the administrator of the actionable content 190 may interact with to organize and/or present the results, for example. As illustrated, the survey results 220 include a 'name' or 'title 222, a 'description' 224, a 'state' 226 (e.g., indicating whether the survey results 204 are published), a 'notification' selection 228 for providing results to the survey takers, and 'anonymous response' selection 230.

As discussed herein, actionable content may be generated via an email interface of the email application on the client instance in response to determining that the third-party web service is a supported third-party web service. Rather than html or text email, directly receiving one or more inputs directly via the third interface based on a user selecting the actionable content. A computing system may verify that a token signed with a private key from the supported third-party service is valid for a known public key from the third-party web service. In response to the verification, the client device may send a message to confirm receipt of the one or more inputs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a client instance hosted by one or more data centers, wherein the client instance is accessible by one or more remote client networks, wherein the system is configured to perform operations comprising:
   receiving a request to link a third-party communication interface with the client instance, wherein the third-party communication interface is configured to display information relevant to one or more enterprise operations;
   transmitting an access token to a third-party application associated with the third-party communication interface in response to receiving the request, wherein the access token enables communication between the client instance and an application programming interface (API) associated with the third-party application;
   receiving a validation token from the third-party application subsequent to transmitting the access token;
   verifying an authorization to incorporate the third-party communication interface with a service request interface generated on the client instance based at least in part on the validation token;
   integrating all or part of the service request interface from the client instance with the third-party communication interface in response to the verification, wherein integrating comprises displaying the service request interface concurrent with the third-party communication interface, and wherein the service request interface comprises one or more fields; and
   generating the service request via the service request interface based at least in part on the information displayed by the third-party communication interface, the API associated with the third-party application, and the one or more fields of the service request interface.

2. The system of claim 1, wherein the request is to generate a Visual Task Board (VTB) task.

3. The system of claim 1, wherein the service request is generated dynamically based on associations between the information from the third-party communication interface and the one or more data from the client instance based on the API.

4. The system of claim 1, wherein the request is generated based on trigger data displayed on the third-party communication interface.

5. The system of claim 1, wherein integrating the service request interface comprises generating a display within the third-party communication interface.

6. The system of claim 1, wherein the information relates to portions of an email.

7. The system of claim 1, wherein the information relates to a calendar invite.

8. The system of claim 1, wherein the service request is configured to communicate directly with the client instance via the third-party communication interface.

9. The system of claim 1, wherein the request is to create an incident.

10. A processor-implemented method, the processor-implemented method comprising:
    identifying a request to link a third-party communication interface with a service request interface generated by a client instance, wherein the third-party communication interface is configured to display information relevant to one or more enterprise operations;
    transmitting an access token to a third-party application associated with the third-party communication interface in response to receiving the request, wherein the access token enables communication between the client instance and an application programming interface (API) associated with the third-party application;
    receiving a validation token from the third-party application subsequent to transmitting the access token;
    verifying an authorization based at least in part on the validation token and a comparison between a first account associated with the third-party interface and a second account associated with a client instance;
    integrating the service request interface generated on the client instance with the third-party interface in response to the verification; and
    dynamically generating the service request via the service request interface based at least in part on the information displayed by the third-party interface, the API associated with the third-party application, and one or more fields of the service request interface.

11. The method of claim 10, wherein generating the service request comprises populating the one or more fields of the service request interface that are associated with the information displayed by the third-party interface.

12. The method of claim 10, wherein the service request interface is generated based on an identity of an operator submitting the request.

13. The method of claim 10, wherein integrating the service request interface comprises displaying the one of more fields of the service request interface.

14. The method of claim 10, wherein the request comprises a selection of an interactive element on the third-party communication interface made by an operator.

15. The method of claim 10, wherein the service request is generated dynamically based on associations between the information from the third-party interface and the one of more fields of the service request interface based on an API received by the client instance from a third-party application associated with the third-party interface.

16. The method of claim 10, wherein the authorization is related to an employee of an enterprise.

* * * * *